US008934132B2

(12) United States Patent
Conlon

(10) Patent No.: US 8,934,132 B2
(45) Date of Patent: Jan. 13, 2015

(54) SYSTEMS AND METHODS FOR IMPLEMENTING DYNAMIC USER INTENT-BASED IMAGING OPTIONS IN IMAGE FORMING AND DOCUMENT HANDLING SYSTEMS

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 452 days.

(21) Appl. No.: 13/466,836

(22) Filed: May 8, 2012

(65) Prior Publication Data
US 2013/0301061 A1 Nov. 14, 2013

(51) Int. Cl.
G06K 15/02 (2006.01)

(52) U.S. Cl.
USPC .......................................................... 358/1.2

(58) Field of Classification Search
None
See application file for complete search history.

(56) References Cited

U.S. PATENT DOCUMENTS

| | | | | |
|---|---|---|---|---|
| 7,646,498 B2* | 1/2010 | Chiu | ........................... | 358/1.14 |
| 2002/0141626 A1* | 10/2002 | Caspi | ........................... | 382/131 |
| 2009/0123048 A1* | 5/2009 | Leroux et al. | .................. | 382/131 |
| 2010/0214598 A1* | 8/2010 | Hoppenot et al. | ........... | 358/1.15 |
| 2011/0109919 A1* | 5/2011 | Conlon et al. | .................. | 358/1.2 |
| 2011/0141626 A1* | 6/2011 | Contreras et al. | ........... | 360/245.4 |
| 2013/0235399 A1* | 9/2013 | Conlon | ........................ | 358/1.12 |

OTHER PUBLICATIONS

Conlon; U.S. Appl. No. 13/155,756, filed Jun. 8, 2011; "Frame-Based Coordinate Space Transformations of Graphical Image Data in an Image Processing System".
Conlon; U.S. Appl. No. 13/155,723, filed Jun. 8, 2011; "Image Operations Using Frame-Based Coordinate Space Transformations of Image Data in a Digital Imaging System".
Conlon; U.S. Appl. No. 13/417,101, filed Mar. 9, 2012; "Systems and Methods for Employing Declarative Programming to Optimize Dynamic Operations in Complex Image Forming and Media Handling Devices".
Conlon; U.S. Appl. No. 13/417,136, filed Mar. 9, 2012; "Systems and Methods for Presenting Orientation Flow Graphs in Three Dimensions in Complex Document Handling and Image Forming Devices".

* cited by examiner

Primary Examiner — Jeremiah Bryar
(74) Attorney, Agent, or Firm — Ronald E. Prass, Jr.; Prass LLP

(57) ABSTRACT

A system and method are provided to implement dynamic user intent-based imaging operations in image forming and document handling systems. A common framework is provided to implement the user-intent based imaging operations by which all of the individual component devices are able to be mapped to a particular user's desires such that an output from any particular image forming device in the complex image forming system meets the user's requirements/intent. Operations of component devices of a particular complex image forming system are defined logically. Mappings to the individual devices according to a common reference framework are then overlaid and manipulated according to the common framework. In this manner, a user directs imaging operations, including image shifts, for individual pages, subsets of pages or an entire document in the manner the user intends rather than according to a default understanding of the device.

20 Claims, 4 Drawing Sheets

SYSTEMS AND METHODS FOR IMPLEMENTING DYNAMIC USER INTENT-BASED IMAGING OPTIONS IN IMAGE FORMING AND DOCUMENT HANDLING SYSTEMS

This application is related to U.S. patent application Ser. No. 13/155,756, filed Jun. 8, 2011, entitled "Frame-Based Coordinate Space Transformations Of Graphical Image Data In An Image Processing System," Ser. No. 13/155,723, filed Jun. 8, 2011, entitled "Image Operations Using Frame-Based Coordinate Space Transformations Of Image Data In A Digital Imaging System," Ser. No. 13/417,101, filed Mar. 9, 2012, entitled "Systems And Methods For Employing Declarative Programming To Optimize Dynamic Operations In Complex Image Forming And Media Handling Devices," and Ser. No. 13/417,136, filed Mar. 9, 2012, entitled "Systems And Methods For Presenting Orientation Flow Graphs In Three Dimensions In Complex Document Handling And Image Forming Devices." These applications are co-owned by the Assignee of this application. The disclosures of the related applications are hereby incorporated by reference herein in their entirety.

BACKGROUND

1. Field of Disclosed Subject Matter

This disclosure relates to systems and methods for implementing dynamic user intent-based imaging options in complex image forming systems.

2. Related Art

Complex image forming systems combine image forming processes and associated media handling and finishing processes. In the field of image forming devices, very complex production-type systems for advanced image forming, and the associated media handling, have been, and continue to be, developed and deployed. These complex image forming systems may include, for example, multiple stages of image forming devices with a plurality of feeder devices and a number of finishing devices. Image receiving media flow through these complex image forming (and media handling) systems via multiple paths in an intricate and variable manner according to a particular image forming operation requested by a user and carried out by the complex image forming and finishing systems.

An ordering of the multiple devices in these complex image forming systems can be changed. Individual devices are reordered or replaced in a particular complex image forming system for myriad reasons. As a result, imaging operations and image receiving media flow paths through the complex image forming systems can be changed and can often become confused. In many instances, a result of this confusion is that image forming errors and/or finishing errors occur. Images can be printed upside down, on a wrong side of the paper, or not in a pre-printed form as a user intended. When a pre-printed form is loaded incorrectly, the overlaying image is oriented incorrectly. This can be corrected in a number of ways. The loading of the pre-printed form could be changed to a certain orientation in three dimensions. Otherwise, the complex document handling and image forming system may be made to comprehend the orientation "error" and, for example, rotate the image independently to match the orientation of the pre-printed form. One modifies the orientation of the image receiving medium, while the other modifies image orientation. Finishing errors may include staples being placed in the wrong corner or folds being improperly applied. Image shifts can be performed in a manner that is wholly detached from an anticipated orientation of the image receiving medium resulting in an improper image shift. These errors, individually or collectively, produce outputs from the complex document handling and image forming systems that are not the finished product that the user expects, leading to customer dissatisfaction.

What is not clear to the common user of the complex image forming system, but is common knowledge to those of skill in the art, is that any particular imaging task or job requested by a user includes multiple individual imaging and media handling operations, each according to a specified orientation. An exemplary and non-exhaustive list of individual imaging operations includes scaling or sizing, translation or image shift, mirroring or reflecting, and rotation of images in two dimensions and of image receiving media in three dimensions. Each individual image processing and/or media handling component that is included as a portion of a particular complex imaging forming system may carry out individual tasks with a particular flow of the images and the image receiving media through that individual component that cannot be changed.

Difficulties often arise in that an order of individual image forming operations is non-commutative. As such, certain manipulation of the order of the operations, including adding additional steps, could be undertaken to produce a repeatable output based on an ordering of the operations. This manipulation can make the outcome of the operations repeatable. Stated differently, any change in the order of these operations as a set of transformations will typically result in a different output unless modified in some manner that may or may not be available to the system designer and/or programmer.

The above difficulties can be compounded based on conventional approaches to programming of the individual devices and specifically characterizing orientations of images and image receiving media within that programming. The characterizations of orientations of images and image receiving media in the programming of conventional systems are generally viewed, and therefore provided, in a descriptive or narrative form. When programs are written in, for example, C code or C++, rather than characterizing the image orientations according to any common and manipulable mathematical framework, descriptive terms (or enumerations) are employed. These may include, for example, descriptors such as "faceup" or "facedown," and "inboard" or "outboard." With regard to raster orientations, similar descriptive terms are used such as, for example, "slow scan" and "fast scan." In finishing devices, these descriptive terms may include specification, for example, of stapling being directed to an "upper left" corner of a document. These descriptive terms may be generally understood and tracked in the context of a single simple image forming device. Interpretation of these descriptive terms, however, across different devices that make up a complex image forming system tends to be inconsistent and therefore haphazard.

Individual component devices within the complex image forming system operate according to their own default coordinate spaces in two dimensions for imaging and in three dimensions with regard to image receiving medium orientations. The system designer and/or programmer must piece together individual component devices of the complex image forming system initially according to a complex iterative trial and error process in order to provide a complex image forming system in which a user obtains an output from his or her requested imaging job according to the user's desires. For example, if a sheet of image receiving media goes through a complex system, and at the output of the complex system, the image is upside down, or otherwise not in the desired or expected orientation, the system designer and/or programmer may add a rotation to account for this discrepancy. There will be instances, however, where the addition of such steps in not possible.

Once this complex iterative trial and error method is completed for a particular system, the system designer and/or programmer may not be finished. The schemes that result from the trial and error process remain very fragile. Even slight changes in operations can cripple the correctness of the solution. In highly configurable systems, when a particular component in the complex image forming system is replaced, the process must be repeated, often again in a trial and error manner, in order to obtain a repeatable outcome that is according to the user's desires. Simpler systems have fewer degrees of freedom and are, therefore, less problematic, but the problem still exists. In other words, any slight change in configuration for the system generally renders all of a previous trial and error effort to determine a correct scheme a nullity. The system programmer must, in many cases, essentially start over from scratch. The inherent difficulties in the trial and error "solution" manifest themselves with users as well. In certain production systems, users are sent "cheat sheets" with work-arounds to correct imaging operation errors. Operating scenarios are modified by providing a user with a menu of options regarding how to lie to the device to make it work, i.e., to produce a desired or user-intended output.

Absent smart algorithms in complex image forming systems with multiple feeders and finishers, functions that are undertaken, for example, by feeders and/or finishers will rely on default settings that are device-based and will likely produce results that are not in accordance with the user's desires, i.e., as the user "intends" or "intent-based." In other words, processing within device will remain device centric, rather than user centric.

SUMMARY OF THE DISCLOSED EMBODIMENTS

In view of the above-identified shortfalls in conventional complex image forming and systems, previous research by the inventor of the subject matter of this disclosure has defined a common framework for transformation of image origins and coordinate spaces across multiple devices. See, e.g., co-owned U.S. patent application Ser. No. 13/155,756, entitled "Frame-Based Coordinate Space Transformations Of Graphical Image Data In An Image Processing System" and Ser. No. 13/155,723, entitled "Image Operations Using Frame-Based Coordinate Space Transformations Of Image Data In A Digital Imaging System."

In a three-dimensional system, there is a set of forty-eight definable coordinate systems. (Note that in this context, imaging typically occurs in a two-dimensional coordinate system. In the two-dimensional system, there is a set of eight definable coordinate systems that may simply be considered a subset of the set of forty-eight definable three-dimensional coordinate systems in which Z is consistently set to zero). One of the forty-eight variations represents the standard Cartesian coordinate system, and the other forty-seven variations are deviations from that standard. For ease of interpretation, and to avoid confusion, this disclosure will refer to the available set of coordinate systems as "the forty-eight coordinate systems." This set of forty-eight coordinate systems is based on the existence of six permuted sets of XYZ orientations that can be mapped to each of the eight corners of a cube representing the three-dimensional system. These forty-eight coordinate systems can be alternatively mathematically represented according to a corresponding set of forty-eight individual mathematical representations transformations that respectively identify each of the coordinate systems.

Examples of limited numbers of the above-described mathematical representations and associated visual representations are presented in the above-identified co-owned U.S. patent applications. FIGS. 1A and 1B illustrate an example correspondence between a visual representation of a three-dimensional coordinate system 100 and a corresponding mathematical representation 150 according to this inventor's previous work as a foundation for the disclosed systems and methods. As shown in FIG. 1A, each of the forty-eight coordinate systems may be visually represented as having an origin 110 from which orthogonal axes, X-axis 120, Y-axis 130 and Z-axis 140 emanate. The origin 110 could be any one of the eight corners of the depicted cube. Varying combinations of the axes will emanate from each of those origins resulting in the forty-eight coordinate systems discussed above. A mathematical representation 150, in a mathematical matrix format as shown in FIG. 1B, may be assigned to each of the coordinate systems. This assignment of mathematical representations, in a mathematical matrix format, as shown, facilitates combining program operations (transformations) using matrix algebra as a processing medium for the systems and methods according to this disclosure. It should be noted that the specific mathematical representations shown in FIG. 1B, and in the referenced documents, are only examples of the mathematical representation matrices that could be employed to define each of the forty-eight coordinate systems. Those of skill in the art of image forming systems and mathematics will recognize that a particular three-dimensional coordinate system can be represented in a number of different ways mathematically in the form of a numerical matrix.

Regardless of their construct, the corresponding set of forty-eight individual mathematical representations, when taken together, define a mathematical group under the operations of rotations and reflection. With the forty-eight coordinate systems being defined or represented mathematically, matrix algebra is applied in manipulation of the individual mathematical transformations to rotate or reflect the coordinate spaces to different ones of the forty-eight possible orientations. Each resultant orientation is a member of the mathematical group. Any series of multiple operations undertaken to a beginning orientation necessarily results in an ending orientation that is defined as one of the orientations in the group.

An advantage of finding a common definition or interpretation for the multiple coordinate systems as they are applied to image forming and media handling devices is that individual orientations of images and image receiving media in the image forming and media handling devices can be expressed and manipulated according to the common mathematical framework. Coordination can then be effected between the image receiving media flowing through a complex system of multiple devices and images being processed by the system according to raster images and visual images. It should be noted that a raster image orientation may be different from a visual orientation. What you see on the screen is not necessarily the orientation of the scanned image in the device. Visual images may be in one orientation while raster images are in another orientation based on the device that scans the visual image. When the raster image orientation differs from the visual image orientation, it is likely that, when the images laid down on the image receiving medium, it will be done incorrectly. An inability to model these orientations is what leads to the above-described trial and error method for correcting incorrect images. The disclosed and discussed systems and methods may provide seamless integration spanning visual, raster, and device spaces.

Application of the mathematical framework provides a capability by which the effects of changes that are made in an order of imaging operations can be accurately predicted and evaluated, obviating the requirement for conventional complex trial and error processes in order to achieve or maintain the desired output from the system. The derived mathematical framework facilitates a level of automation and precision that was previously unavailable to system designers and/or programmers.

Systems and methods described in U.S. patent application Ser. Nos. 13/417,101 and 13/417,136 provide schemes by which to track changes of orientation for images in two dimensions and image receiving media in three dimensions in order that, for example, the user may be told how to properly pre-flight the image forming system (load the image receiving media in the input tray) or create and/or orient the image appropriately to achieve the desired outcome. There will be situations, however, where the loading of the image receiving medium in the input tray is fixed, particularly where the complex image forming systems may include multiple flow paths through which the complex systems act on image receiving media input from a common source. Given these constraints, it may be necessary to modify the operation of one or more component devices in order that the output is as the user intends. An example may be where the image receiving medium passes through much of the complex image forming system in a long edge feed (LEF) orientation. At some point in the image flow path through the complex image forming device, a component device may change the orientation of the image receiving medium to short edge feed (SEF) for a particular reason. Because this changes the orientation that may be presented to a next or other downstream component device, the component device must be predictably programmed to perform an imaging operation with respect to the image receiving medium based on the orientation that the image receiving medium is presented to the component device which may be different from the default operation of the component device.

It would be advantageous in view of the above-identified shortfalls in the prior art to expand this inventor's concept, as described in the above-referenced documents, to cover all imaging operations, including image shift, in component devices in complex image forming and media handling systems. An advantage in implementing a user intent-based methodology is to provide a common framework by which all of the individual component devices are able to be mapped to a particular user's desires such that an output from the complex image forming system meets the user's requirements.

Exemplary embodiments of the systems and methods according to this disclosure may define operations of a particular complex image forming system logically and then overlay mappings to the individual devices according to a common reference framework.

Exemplary embodiments may provide a common reference framework by which the user can define his or her intent in an effort to direct operation of the component devices that together make up the complex system in the manner the user intends rather than according to a default understanding of each component device.

Exemplary embodiments may introduce a formal model describing various components that impact imaging operations including image shift. With such a formal model of a configuration of a complex image forming and media handling system, algorithms for making adjustments to produce intent-based results may be implemented that are concise and comprehensible so that correct intent-based processing occurs despite changes in the system configuration. Today, these processes are fragile with complex systems. Applying the disclosed concepts makes these processes more robust.

Exemplary embodiments may provide an expanded set of capabilities to simultaneously conduct imaging operations, including image shift, at set and sub-set levels for complex document production.

Exemplary embodiments may introduce computer graphics affine mathematics and matrices to describe operations and relations between individual imaging operations (generally in two dimensions) and image receiving medium handling operations (potentially in three dimensions).

Exemplary embodiments may provide, specifically for image shift in complex imaging forming and media handling systems, an explicit and functional system model. Employing the system model, software may make intelligent decisions or transformations regarding image shift for different shifts for different feeder/finisher configurations, image processor(s) and/or ROS rasterizing orientations. Applying the proposed systems and methods may aid system developers in avoiding the standard and fragile trial and error approach to under the hood corrections of given configuration attributes. Current approaches are rigid and image shift is device configuration based rather than being intent-based. The systems and methods according to this disclosure may provide a formal process by which to account for configuration changes.

Exemplary embodiments propose a solution that uses transformations to describe mathematical relations between individual "objects" (components) in the complex image forming and media handling systems. For example, if one considers separate image spaces from a sheet space, the system may want to rotate the image prior to marking the sheet.

Exemplary embodiments may define a relation for both a set level and a sub-set-level image shift. A shift on a sub-set may be composited with a shift for an entire set. Today, no formal mapping describes the relation between an imager such as, for example, a ROS or a scanner, and a finishing device.

Exemplary embodiments, prior to marking, e.g., imaging with a ROS, operations can be defined in an image processor. Experience shows that these devices have a variety of raster orientations, which can be different from the ROS raster orientation, so a mapping/transform may be defined. Known operations, such as tumble, duplex, inversion and the like, can be described with three-dimensional rotation matrices.

Exemplary embodiments may encapsulate the following concepts: (1) Introduction of a mathematical framework to support image shift in complex imaging device configurations; (2) Adaptation of computer graphics operations to define multiple related image shift related transformations as well as relations between device components; (3) Provision of easier and correct composites of operations based on the affine nature of the transformations; and (4) Provision of multiple levels of flexibility, e.g., ability to shift at both a set and a sub-set level even as the individual shifts composite. The disclosed approach deals with the side-to-side imaging relation, and describes complex path modeling with various imaging system components.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing dynamic user intent-based imaging operations, including image shift, in image forming and document handling systems will be described, in detail, with reference to the following drawings, in which.

DETAILED DESCRIPTION OF THE DISCLOSED EMBODIMENTS

Figures 1A, 1B:
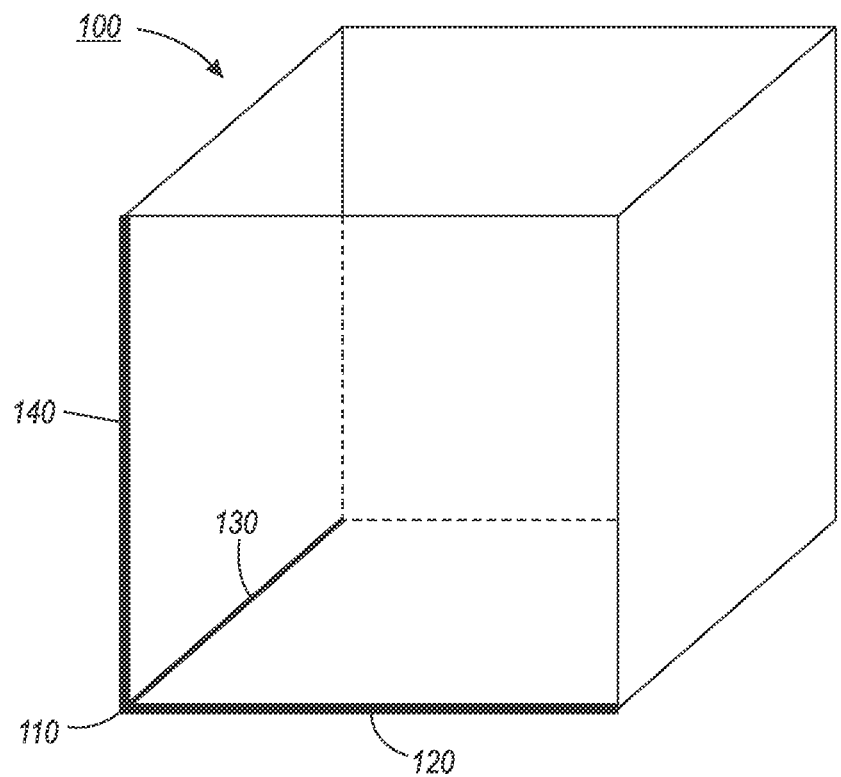
FIGS. 1A and 1B illustrate an example correspondence between a visual representation of a three-dimensional coordinate system and a corresponding mathematical representation according to this inventor's previous work as a foundation for the disclosed systems and methods.

The systems and methods for implementing dynamic user intent-based imaging operations in image forming and document handling systems according to this disclosure will generally refer to this specific utility or function for those systems and methods. Exemplary embodiments described and depicted in this disclosure should not be interpreted as being specifically limited to any particular configuration, any particular set of mathematical representations associated with a set of coordinate spaces, or any particular programming language, or as being specifically directed to any particular intended use. Any methodology for controlling complex operations in which components are subjected to a flow of the individual components through a complex manufacturing system including multiple devices each with its own flow path for the individual components through a particular device that may orient the components in three dimensions is contemplated as being included in this disclosure.

Specific reference to, for example, an image forming device throughout this disclosure should not be considered as being limited to any particular type of image forming device including, for example, any of a printer, a copier or a multi-function device. The terms "image forming device" and "complex image forming system," as referenced throughout this disclosure are intended to refer globally to any component, device, system, or system of systems that include various capabilities for electronic image processing and/or image receiving media handling. These various capabilities generally include receiving an image from an image source and an image receiving medium from an image receiving medium source, registering the image on the image receiving medium, and finishing the image forming process by mechanically manipulating the image receiving medium with some manner of finisher. The finisher may comprise, for example, a stapling device, a hole punching device, a folding device, a binding device, or other like output finishing device that would be familiar to those of skill in the art.

The systems and methods according to this disclosure will be described as being particularly adaptable to use in complex image forming systems including a plurality of feeder and finisher devices. Complex image forming systems may include multiple feeders, multiple marking engines, and multiple finishers, but the systems and methods according to this disclosure should not be considered as being limited to any particular level of complexity or any particular combination of image processing and/or media handling component devices.

The term "intent-based" generally refers to making a particular image forming device comply to a user's specific desires without the need/burden to consider the underlying device specifics. Consider, for example, the user holding a sheet of image receiving medium and indicating that processing of an image be undertaken with respect to a specific origin as the user holds the sheet of image receiving medium. "Intent" should be broadly interpreted to refer generally to an outcome that meets the user's expectations, e.g., as the user "intended," or as the user holds the sheet of image receiving medium.

Intent-based implementations with regard to imaging operations mean basically as the user intended. The user "expects" an operation to be executed with regard to the document in an orientation that the user holds the document, and not as the user intended the document to come out of a particular device. In each imaging operation, the user may want to specify an origin and axes of operations for the imaging operation with regard to the image receiving medium as the user holds the document, and not as the document may be presented to the component device. An ability to configure individual component devices with different orientations, or to accept job tickets originally printed on another device with a different configuration, by correctly mapping coordinate spaces based on a component device's default orientation is problematic. The disclosed common framework seeks to simplify the problem.

Operations, actions and definitions in an intent-based space may, therefore, be invariant with respect to any specific device. A relationship between an intent-based space and device spaces may be "one-to-many." That is, a single intent-based space can map to multiple different device spaces, which are based on particular device configurations. Mappings may be "within space(s)" or "across space(s)." Mappings for intent-based operations are user oriented. Mappings for devices model relations between device components or the way paper is presented to the device.

A scanner scans an image according to a particular orientation and a rasterizing direction. A raster output scanner (ROS) may image according to a different direction. A different easy example is to consider horizontal scanning for the scanner that produces the raster image by scanning the document. The scanner may scan the document vertically while the ROS may output an image on the document horizontally, resulting in differing and/or incompatible raster orientations. Another example is where, as in most home scanners, the origin is the upper left corner of the document, and the scanner scans from left to right and then vertically down the document. Conversely, some professional/industrial MFDs have a different origin and raster scanning directions. These different device/raster orientations, by virtue of their difference, mean that the raster image produced from scanning a document may be in a different orientation than the image as one holds the paper. Different devices, therefore, may create different raster images from the same scanned document. When the image is to be printed on an image receiving medium by a ROS that may be a separate device component, without a specific indication of the origin and the axes of operations, and a relationship of the coordinate system for the raster image to the coordinate system for the ROS, the image may become oriented incorrectly with respect to the image receiving medium.

In image shift, in addition to having to deal with orientation of a particular image or sheet of image receiving medium, the complex image forming system must deal with: (1) a direction that an image may be offset with respect to an origin being used by the individual image forming device, and axes of operations associated with that origin. In other words, all measured offsets need to be with respect to a specified origin and in specific directions of operation. Consider an image shift to be a vector quantity (with magnitude and direction), or a shifting of the image along a particular vector with X and Y coordinates. Defining shift as a translation vector in affine format makes in a vector space make it amenable to matrix manipulation. Most users and software developers do not understand that each imaging operation carried out by an individual component device in a complex image forming system has associated with it a coordinate (or vector) space for that imaging operation in that device. Between devices in the complex image forming system, coordinate spaces may differ, yet they must all be coordinated with each other. Based on this general disconnect between individual devices, difficulties arise in imaging and finishing operations.

Image shift is defined as a translation vector implemented using an affine translation matrix. Multiple kinds of shifts create the equivalent of vector addition, but may be executed using composition via matrix multiplication of translation matrices. A vector format has conceptual advantages and simplifies the math. Consider an image or sheet of image receiving medium to be a "solid body" so a vector shift from any point is equivalent. Vectors care only about magnitudes and directions, not locations. The simplification is that, regardless of where a translation vector is located, it can be thought of as emanating from the origin, which imposes less constraints on composition. Shifts may be desired/defined for users, devices or both. For example, a user may define a shift, but an additional shift may be needed due to finishing, in which case the two shifts are combined.

It should be noted that intent-based level operations can be separated from device-level, configuration-dependent operations. In a strictest sense, intent-based level operations may be executed within different coordinate spaces independently, and with transforms being defined that map between the different spaces. Coordinate spaces then have relations defined between them. For example, the relation of an image coordinate space relation to a sheet, a sheet relation to a feeder, an image processor to an imager, and so on. The disclosed framework allows integrated modeling of both imaging (intent-based and device-based) and non-imaging devices (e.g., feeders and/or finishers). This level of comprehensive, integrated modeling is novel. In essence, it is applying systems engineering with the novel group of orientation matrices to make it work.

As an example of the above the above disconnect, consider when a sheet is inverted in a book mode in which the image receiving medium is flipped along its long edge versus a calendar mode in which the image receiving medium is flipped along its long edge. When a sheet is inverted in a book mode, a top of an image on one side of the sheet will be with respect to the same "top" edge of the sheet of image receiving medium. On the other hand, when a sheet is inverted in a calendar mode, a top of an image on either side of the sheet will be with respect to different and opposite edges acting respectively as the "top" edge.

Consider the front and back of the sheet as having "surfaces" (or "faces") that conform to the notion of frame-based coordinate spaces in three dimensions. The sides may be related via a rotation in three dimensions, either across the X or Y axes.

The use of "inverters" in the code is done via a three dimensional rotation, created with standard graphics three-dimensional (affine) rotation matrices. Rotations (and reflections) are always "about" a given axis. Inverters can be for both intent-based (front-back image orientation relation), and for sheets being physically inverted in the paper path (e.g., duplex paper path). Both relations must be considered to ensure correct image shift (and other correct surface/face-related operations).

Consider the two front-back relations—book and calendar style layouts (also referred to as duplex and tumble modes)—discussed briefly above. Book mode flips about the Y axis. Calendar mode flips about the X axis. This distinction becomes an issue for side two translations as the translation vector is influenced by the side-side transformation.

Image shifts will be relative to an image origin, so if the image gets rotated, the origin-relative shift would get rotated. Conversely, sheet-centric shifts are typically related to a particular sheet corner or edge. A classic example is with hole-punching, where one may want to shift an image so that it does not get punched. In the traditional, legacy sense, this is called a mirrored shift, as it needs to shift side two in an opposite direction along one dimension. The shift value is negated, which is where the name comes from. But this is poorly understood. It is a function of a three dimensional rotation, but it is treated like a two dimensional reflection operation.

Conventionally, the problem may be addressed by device-specific code for a particular configuration, not dynamically managed by a system in the manner proposed. The "declarative" programming schemes discussed in related U.S. patent application Ser. No. 13/417,101 may aid in determining feasible image rotations/reflections and paper rotations in three dimensions for images as well as for finishers and as part of an overall system. In this regard, it should be understood that the devices are "stupid." Once the operations of the individual devices that make up the complex system are converted into a mathematical form, it becomes possible to write code that searches for the set of feasible conditions to apply to finishing as well. Using the systems and methods according to this disclosure, a system developer may enumerate and test feasibility of a mapping from intent-based user requests to imaging operations.

According to the disclosed systems and methods, all components in a complex image forming system may be modeled, those models may be composited, and the composite matrix may then be applied to the user's intent-based image shift in order that the shift vector origin and coordinates are correct when it comes time to place the image on the image receiving medium. This process provides a very clear, definitive, efficient, correct and repeatable manner by which to ensure that the user's intent-based image shift is carried out.

Figure 2:
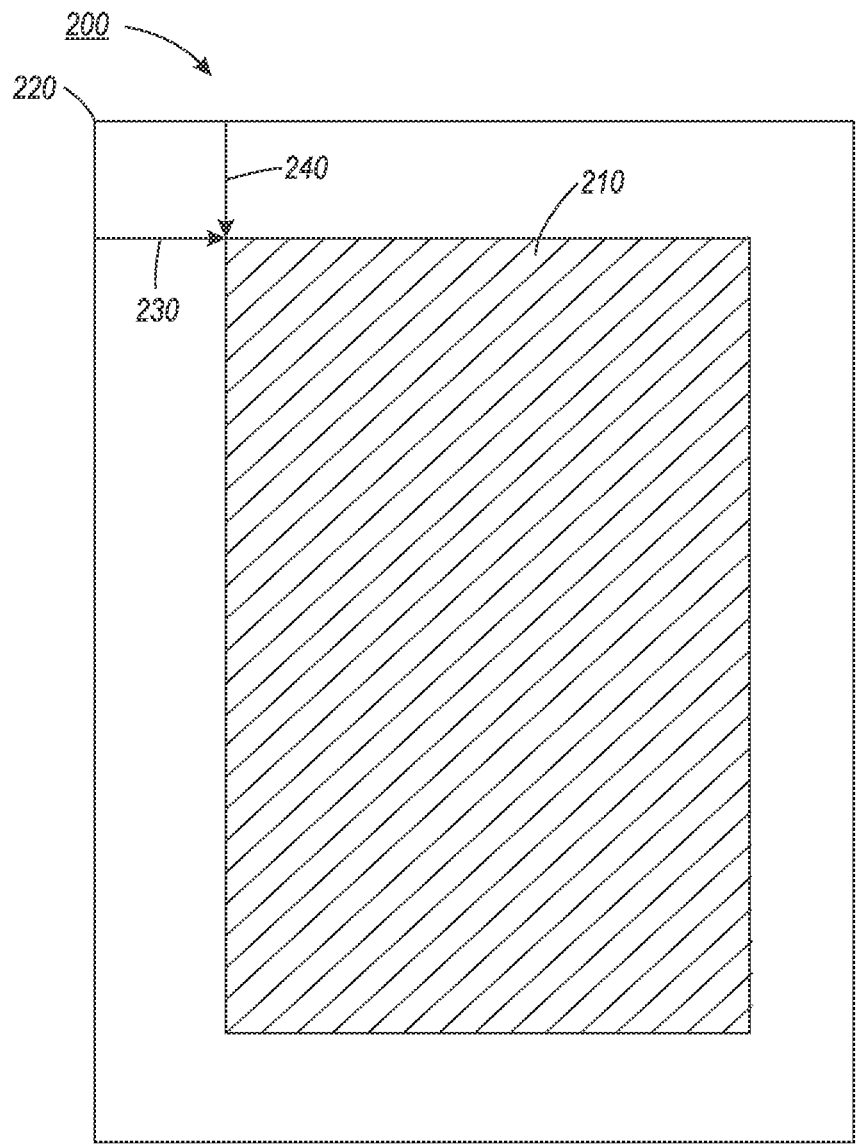
FIG. 2 illustrates an exemplary representation of an image recorded on an image receiving medium with information provided that may be manipulated according to the disclosed systems and methods.

FIG. 2 illustrates an exemplary representation of an image recorded on an image receiving medium with information provided that may be manipulated according to the disclosed systems and methods. This approach allows all imaging operations, and particularly image shift, to "play" in a formal dynamic framework for handling image receiving media and image orientations in a complex image forming system.

FIG. 2 illustrates an exemplary image receiving medium 200 on which an exemplary image 210 is produced. In this example, the exemplary image 210 is shifted from with respect to an origin 220. The image is shifted from the origin 220 by an X coordinate 230 and a Y coordinate 240 according to specified axes of operations, i.e., right and down in this example. These directions and magnitudes of image shift constitute an image shift vector.

This simple example is indicative of the types of imaging operations that may be input by a user to a complex image forming system. Each of the operations then that is undertaken by the complex image forming system could be mathematically represented. Those mathematical representations could be composited together through matrix multiplication to arrive at a composite transformation for the imaging operations in the complex image forming system. That composite transformation may then be applied to the user's input conditions to yields a composited operation that correctly produces an image on the image receiving medium.

Depending on the user's inputs, the imaging operations, including image shift, may be with respect to any combination of single images, partial images, multiple images and/or composite images produced on individual sheets. Image shift operations, for example, may also be with respect to individual sheets, subsets of sheets or segments of a document, or a complete document.

In the manner described above, the disclosed systems and methods present a novel use of mathematical frameworks and mappings to preserve user intent-based selections for imaging operations in image forming and media handling devices. This specific solution allows a user to define the user intent-based imaging features up front and to have those selections correctly carried out when the imaging occurs on the image receiving medium. The method provides "clean" definition of logical imaging operations.

Figure 3:
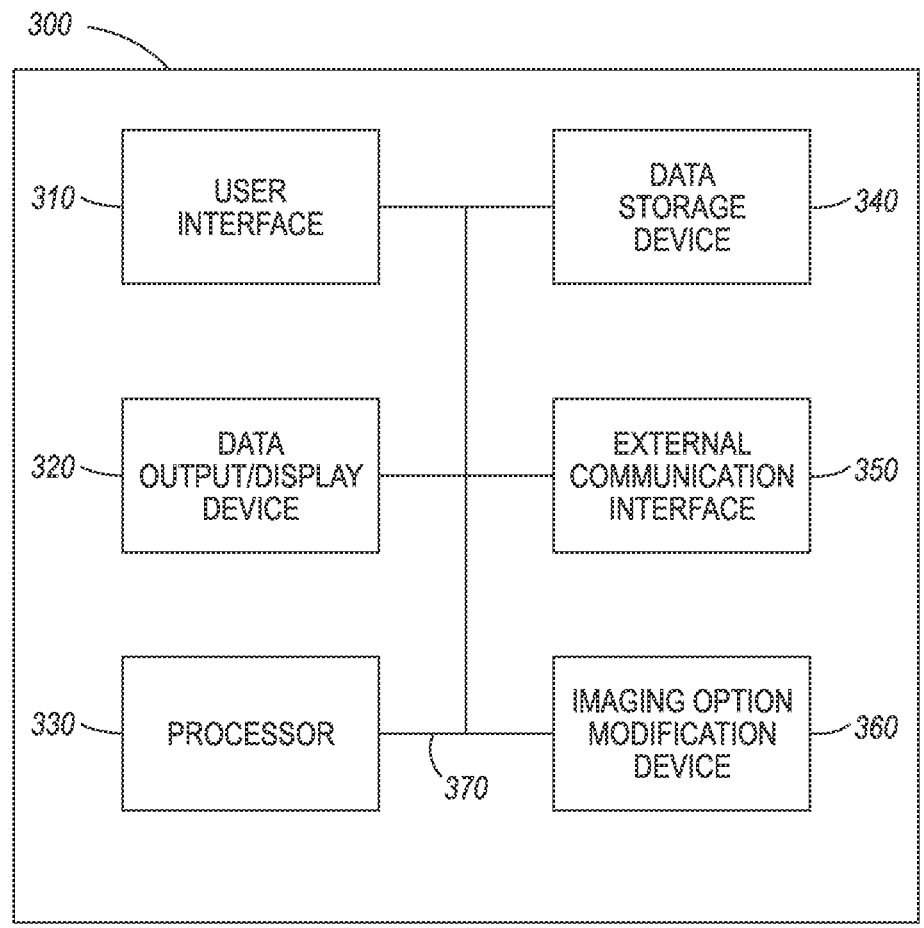
FIG. 3 illustrates a block diagram of an exemplary system for implementing dynamic user intent-based imaging operations in image forming and document handling systems according to this disclosure.

FIG. 3 illustrates a block diagram of an exemplary system 300 for implementing dynamic user intent-based imaging operations in image forming and document handling systems. The exemplary system 300 may be associated with one or more complex image forming systems as either a standalone device or as a device integrated with the one or more complex image forming systems to modify operations of one or more image forming devices in the one or more complex image forming systems according to a user's intent-based requirements.

The exemplary system 300 may include a user interface 310 by which a user may communicate with the exemplary system 300. The user interface 310 may be configured as one or more conventional mechanisms common to computing devices such as, for example, a user's workstation, that permit the user to input information to the exemplary system 300. The user interface 310 may include, for example, a conventional keyboard and mouse, a touchscreen with "soft" buttons or with various components for use with a compatible stylus, a microphone by which a user may provide oral commands to the exemplary system 300 to be "translated" by a voice recognition program, or other like device by which a user may communicate specific operating instructions to the exemplary system 300. Alternatively, the user interface 310 may be coupled with the data output/display device 320 as part of a graphical user interface (GUI) associated with the one or more complex image forming systems.

The user interface 310 may be employed by the user to provide instructions to the exemplary system 300 to direct operations of the system 300. The user interface 310 may be employed by the user to input user intent-based imaging options to the one or more complex image forming systems.

The exemplary system 300 may include a data output/display device 320 that may display information regarding user input provided via the user interface 310, as well as information regarding the functioning of the exemplary system 300. The data output/display device 320 may be, for example, employed to provide a graphical display of the user intent-based imaging option selected by the user via the user interface 310. The data output/display device 320 may comprise any conventional means by which to display relevant data regarding the functioning of the exemplary system 300, and may provide the user, in conjunction with the user interface 310, a means to interactively communicate with, and control, the functions undertaken by the exemplary system 300.

The exemplary system 300 may include one or more local processors 330 for individually operating the exemplary system 300 and carrying out the portions of the dynamic modification of operations of one or more finishers in the one or more complex image forming systems with which the exemplary system 300 is associated. Processor(s) 330 may include at least one conventional processor or microprocessor including, for example, a Graphics Processing Unit (GPU) or Central Processing Unit (CPU), that may be provided to interpret and execute instructions in cooperation with other system components for implementing dynamic user intent-based imaging options according to this disclosure in the one or more complex image forming systems. Processor(s) 330 may interpret inputs regarding user-requested imaging options received via a user interface 310. Processor(s) 330 may receive inputs regarding operations of one or more image forming devices in the one or more complex image forming systems by, for example, recovering data regarding the operations from information stored in one or more data storage devices 340 or by communicating directly with the one or more image forming devices the one or more external communication interfaces 350. Processor(s) 330 may track orientations of image receiving media as the image receiving media passes through each of multiple flow paths in the one or more complex image forming systems. It should be noted that these orientations can be tracked in two dimensions and/or three dimensions according to the previously-developed work of the inventor of the subject matter of this application, as discussed in detail in the above-discussed references by this same inventor. Mathematical representations of the operations and orientations provide a common frame of reference for tracking these orientations.

Processor(s) 330, on their own, or in conjunction with a specific imaging option modification device 360, may execute an algorithm that takes as inputs (1) an orientation of a sheet of image receiving media as it arrives at a particularly-selected image forming device in the one or more complex image forming systems, (2) a user's intent-based imaging option, which may include a value for an image shift from a user-specified origin and according to user-specified axes of operations for the particularly-selected image forming device, (3) a user's intent-based indication as to whether separate imaging operations are to be applied to individual images, individual sheets, segments of a document or an entire document; and (4) device-centric imaging options available in the particularly-selected image forming device. The algorithm may be applied to select from among the device-centric image forming options available in the particularly-selected image forming device in order to apply the user's intent-based imaging option(s).

The exemplary system 300 may include one or more data storage devices 340 to store relevant data, and/or such operating programs as may be used by the exemplary system 300, and specifically the processor(s) 330 to carry into effect the specified dynamic user intent-based imaging options in the one or more complex image forming systems with which the exemplary system 300 is associated. At least one data storage device 340 may be designated to act as a specific repository for storing a database that may be pre-loaded with information regarding available and the default imaging options for each of the image forming devices associated with the one or more complex image forming systems with which the exemplary system 300 is associated.

Data storage device(s) 340 may include a random access memory (RAM) or another type of dynamic storage device that is capable of storing collected information, and separately of storing instructions for execution of system operations by, for example, processor(s) 330. Data storage device(s) 340 may also include a read-only memory (ROM), which may include a conventional ROM device or another type of static storage device that stores static information and instructions for processor(s) 330.

The exemplary system 300 may include one or more external data communication interfaces 350. The external data communication interface(s) 350 may be provided to facilitate communication with one or more image forming devices in the one or more complex image forming systems in order to obtain from the one or more image forming devices information appropriate to the implementation of the dynamic user intent-based imaging options in the one or more complex image forming systems, or provide to the particularly-selected image forming device instructions regarding the image forming operation to be carried out by the image forming device according to the user's intent-based instructions as properly modified by the composite transformation matrix calculated by compositing the operations of individual devices upstream of the image forming device. The external data communication interface 350 may also obtain inputs for the exemplary system 300 from, for example, sensors in image receiving media input trays and along image receiving media flow paths to sense orientations of image receiving media at differing points in the system. The external data communication interface(s) 350 may be provided to facilitate wired or wireless communication between the exemplary system 300 and the one or more image forming devices.

The exemplary system 300 may include an imaging option modification device 360 that may operate in conjunction with the processor(s) 330 and/or the one or more storage devices 340 to undertake implementation of the user intent-based imaging options in the particularly-selected image forming device according to the above discussion.

All of the various components of the exemplary system 300, as depicted in FIG. 3, may be connected by one or more data/control busses 370. These data/control busses 370 may provide wired or wireless communication between the various components of the exemplary system 300 regardless of whether those components are housed within, for example, a single computing device, or individual ones of the components are housed independently, and also whether the exemplary system 300 is located within one or more complex image forming systems with which exemplary system 300 is associated.

It should be appreciated that, although depicted in FIG. 3 as what appears to be an integral unit, the various disclosed elements of the exemplary system 300 may be arranged in any combination of sub-systems as individual components or combinations of components, integral to a single unit, or as separate components housed in one or more user workstations, associated with one or more image forming devices, or may be otherwise remotely located. Therefore, no specific configuration for the exemplary system 300 is to be implied by the depiction in FIG. 3.

Figure 4:
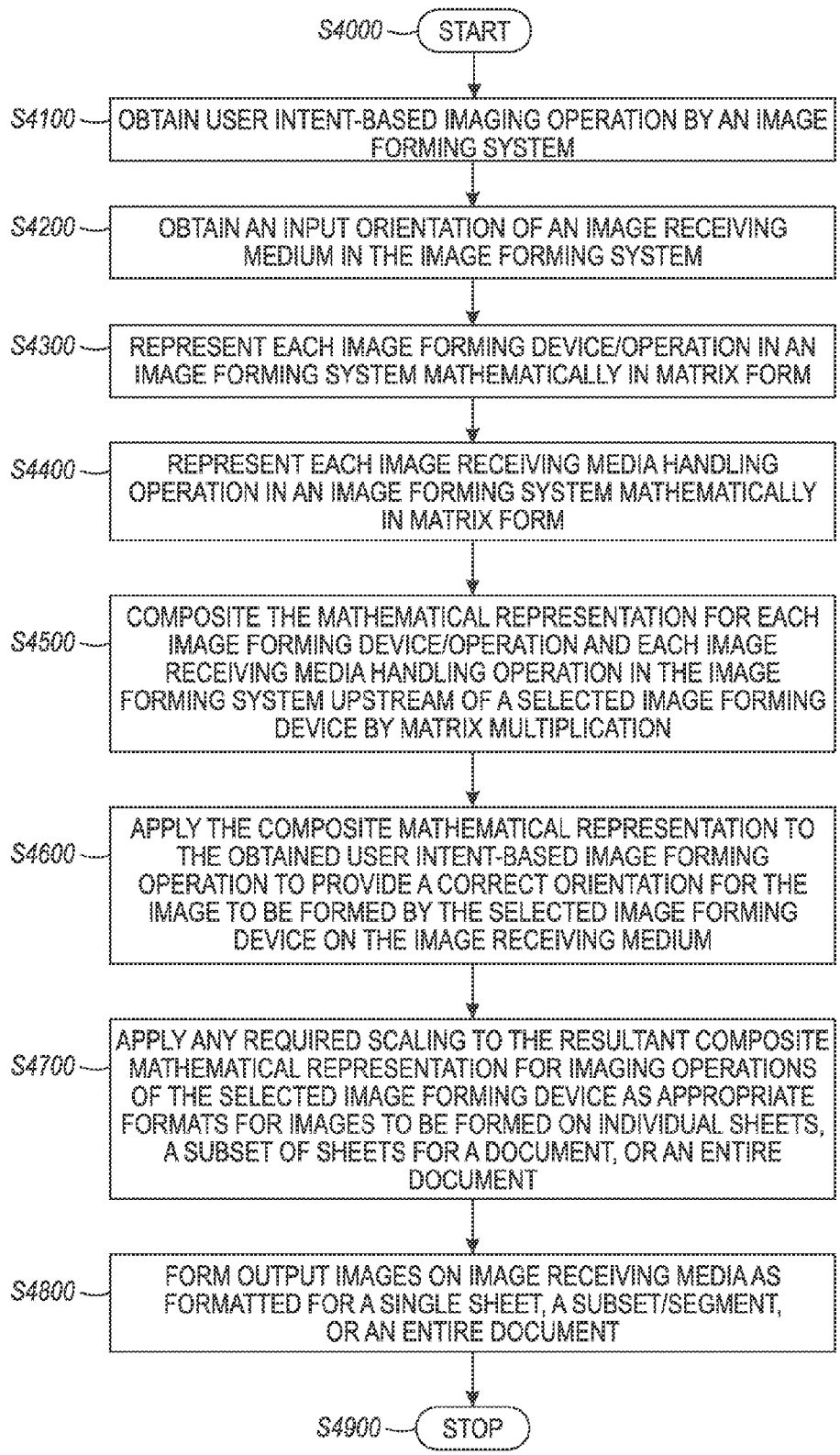
FIG. 4 illustrates a flowchart of an exemplary method for implementing dynamic user intent-based imaging operations in image forming and document handling systems according to this disclosure.

The disclosed embodiments include a method for implementing dynamic user intent-based imaging operations in image forming and document handling systems. FIG. 4 illustrates a flowchart of such an exemplary method. As shown in FIG. 4, operation of the method commences at Step S4000 and proceeds to Step S4100.

In Step S4100, a user intent-based imaging operation may be obtained. Such user intent-based imaging operations may be entered by a user via an input interface in the image forming system. Operation of the method proceeds to Step S4200.

In Step S4200, an input orientation of an image receiving medium may be obtained. The input orientation for the image receiving medium may be obtained through manual input from a user or through automatic sensing in, for example, an input tray. Operation of the method proceeds to Step S4300.

In Step S4300, each image forming device/operation in the image forming system may be represented mathematically in a matrix format. Operation of the method proceeds to Step S4400.

In Step S4400, each manipulation of the image receiving medium as it flows through the system may be represented mathematically in matrix format. Operation of the method proceeds to Step S4500.

In Step S4500, the mathematical representations of each imaging operation and each media handling manipulation that occurs upstream of a particular image forming device may be composited by matrix multiplying the individual mathematical representations to render a mathematical transformation for all operations of the system from input to the particular image forming device. Operation of the method proceeds to Step S4600.

In Step S4600, the composite mathematical representation for all operations upstream of the particular image forming device may be applied to the obtained user intent-based image forming operation. The result may be a correct orientation of the image with respect to the image receiving medium for the particular image forming device. Operation of the method proceeds to Step S4700.

In Step S4700, any required scaling may be applied to the composite mathematical representation. The scaling may represent an image shift vector that defines precise image placement on the image receiving medium. It should be noted that the scaling may apply to single images or individual multiple images to be formed on the image receiving medium. The scaling may apply to individual sheets of image receiving medium, to subsets of pages or segments of a document, or to an entire document. Operation of the method proceeds to Step S4800.

In Step S4800, the particular image forming device may perform the user intent-based imaging operation to form output images on individual sheets of image receiving media, subsets of pages or segments of a document or an entire document as appropriate. The particular image forming device may then output the image receiving media, with the images formed thereon. Operation of the method proceeds to Step S4900, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing means by which to carry into effect the disclosed dynamic user intent-based imaging operations in image forming and document handling systems for familiarity and ease of understanding. Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced with many types of computing systems in many different configurations, executing computer programs in various languages. It should be recognized that embodiments according to this disclosure may be practiced, for example, in computing systems executing differing programming languages. Embodiments according to this disclosure may be practiced in network environments, where processing and control tasks may be performed according to instructions input at a graphical user interface or a user's workstation and/or according to predetermined schemes that may be stored in data storage devices and executed by particular processors, which are in communication with one or more image forming and media handling devices, or complex image forming systems.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer, including graphics processing units and central processing units, as discussed briefly above. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 4, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for forming images in an image forming system, comprising:
    obtaining an indication of a user intent-based imaging operation for a document produced by the image forming system;
    obtaining an input orientation for image receiving media in the image forming system;
    representing image forming operations and changes in orientation of the image receiving media in the image forming system mathematically;
    compositing, by a processor, the mathematical representations of the image forming operations and the changes in orientation of the image receiving media in the image forming system that occur upstream of a particular image forming device to render a composite transformation;
    applying, by the processor, the rendered composite transformation to the obtained user intent-based imaging operation to provide an image transformation for the particular image forming device;
    forming an output image on the image receiving media with the particular image forming device according to the image transformation; and
    outputting the image receiving media with the output image formed thereon.

2. The method of claim 1, further comprising applying scaling, by the processor, to the image transformation for the particular image forming device to at least one of size the output image or shift the output image on the image receiving media according to the obtained user intent-based imaging operation.

3. The method of claim 2, the at least one of sizing the output image or shifting the output image being applied differently for individual sheets of the image receiving media, segments of a document or an entire document.

4. The method of claim 2, the shifting the output image being with respect to a specified origin and in a direction of specified axes of operations.

5. The method of claim 4, the scaling being represented as a vector of a specified magnitude and direction originating at the specified origin and extending in the direction of the specified axes of operations.

6. The method of claim 2, the at least one of sizing the output image or shifting the output image being applied differently for a plurality of output images formed on an individual sheet of image receiving media.

7. The method of claim 1, the indication of the user intent-based imaging operation being obtained by user input via an input interface.

8. The method of claim 1, the input orientation for the image receiving media in the image forming system being obtained by at least one of a user input via an input interface and an automated sensing of the input orientation.

9. The method of claim 1, the image forming operations and changes in orientation of the image receiving media being mathematically represented in matrix form, and the compositing the mathematical representations of the image forming operations and the changes in orientation of the image receiving media being according to matrix multiplication principles.

10. A system for controlling image forming in an image forming system, comprising:

a user input interface that obtains an indication of a user intent-based imaging operation for a document to be formed in the image forming system;

a device that obtains an input orientation for image receiving media to the image forming system;

a processor that is programmed to access mathematical representations of image forming operations and changes in orientation of the image receiving media in component devices that constitute the image forming system;

composite the mathematical representations of the image forming operations and the changes in orientation of the image receiving media in the image forming system that occur upstream of a particular image forming device in the image forming system to render a composite transformation;

apply the rendered composite transformation to the obtained user intent-based imaging operation to provide an image transformation for the particular image forming device in the image forming system; and direct the particular image forming device in the image forming system to form an output image on the image receiving media according to the image transformation, the particular image forming device forming the output image on the image receiving media as directed by the processor and outputting the image receiving media with the output image formed thereon.

11. The system of claim 10, further comprising a data storage device storing the mathematical representations of the image forming operations and the changes in the orientation of the image receiving media for access by the processor.

12. The system of claim 10, the processor being further programmed to apply scaling to the image transformation for the particular image forming device to at least one of size the output image or shift the output image on the image receiving media according to the obtained user intent-based imaging operation.

13. The system of claim 12, the at least one of sizing the output image or shifting the output image being applied differently in the particular image forming device for individual sheets of the image receiving media, segments of a document or an entire document.

14. The system of claim 12, the shifting the output image being with respect to a specified origin and in a direction of specified axes of operations.

15. The system of claim 14, the scaling being represented as a vector of a specified magnitude originating at the specified origin and extending in the direction of the specified axes of operations.

16. The system of claim 12, the at least one of sizing the output image or shifting the output image being applied differently for a plurality of output images formed on an individual sheet of image receiving media.

17. The system of claim 10, the input orientation for the image receiving media in the image forming system being obtained by at least one of a user input via an input interface and an automated sensing of the input orientation.

18. The system of claim 10, the image forming operations and changes in orientation of the image receiving media being mathematically represented in matrix form, and the compositing the mathematical representations of the image forming operations and the changes in orientation of the image receiving medium being according to matrix multiplication principles.

19. A non-transitory computer-readable medium storing instructions which, when executed by a processor, cause the processor to execute the steps of a method comprising:

obtaining an indication of a user intent-based imaging operation for a document produced by an image forming system;

obtaining an input orientation for image receiving media in the image forming system;

representing image forming operations and changes in orientation of the image receiving media in the image forming system mathematically;

compositing the mathematical representations of the image forming operations and the changes in orientation of the image receiving media in the image forming system that occur upstream of a particular image forming device to render a composite transformation;

applying the rendered composite transformation to the obtained user intent-based imaging operation to provide an image transformation for the particular image forming device;

forming an output image on the image receiving media with the particular image forming device according to the image transformation; and outputting the image receiving media with the output image formed thereon.

20. The non-transitory computer-readable medium of claim 19, the image forming operations and changes in orientation of the image receiving media being mathematically represented in matrix form, and the compositing the mathematical representations of the image forming operations and the changes in orientation of the image receiving medium being according to matrix multiplication principles.

* * * * *